(12) United States Patent
Okada et al.

(10) Patent No.: US 8,020,393 B2
(45) Date of Patent: Sep. 20, 2011

(54) HEAT PUMP TYPE HOT WATER SUPPLY OUTDOOR APPARATUS

(75) Inventors: Kazuki Okada, Tokyo (JP); Takahiro Ushijima, Tokyo (JP); Kengo Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 426 days.

(21) Appl. No.: 12/360,439

(22) Filed: Jan. 27, 2009

(65) Prior Publication Data

US 2009/0241569 A1    Oct. 1, 2009

(30) Foreign Application Priority Data

Mar. 31, 2008    (JP) ................................. 2008-091634

(51) Int. Cl.
*F25B 49/02* (2006.01)
*F25B 41/04* (2006.01)
(52) U.S. Cl. .............. 62/196.1; 62/197; 62/205; 62/513
(58) Field of Classification Search .................... 62/113, 62/160, 196.1, 197, 204, 205, 513
See application file for complete search history.

(56) References Cited

U.S. PATENT DOCUMENTS 5,056,329 A * 10/1991 Wilkinson ...................... 62/197
2009/0071177 A1 * 3/2009 Unezaki et al. .............. 62/196.1
2010/0115975 A1 * 5/2010 Mitra et al. ................... 62/196.1

FOREIGN PATENT DOCUMENTS

JP    2006-258343 A    9/2006

\* cited by examiner

*Primary Examiner* — Marc E Norman
(74) *Attorney, Agent, or Firm* — Posz Law Group, PLC

(57) ABSTRACT

A heat pump type hot water supply outdoor apparatus, in a compressor, a water heat exchanger, a first expansion valve, a medium pressure receiver, a second expansion valve, and an air heat exchanger are connected circularly, has an injection circuit, which is a bypass for a part of the refrigerant between the medium pressure receiver and the second pressure reduction unit, to inject the part of refrigerant into a compression chamber of the compressor, and has a third expansion valve and an internal heat exchanger for carrying out heat exchange between the refrigerant whose pressure is reduced by the third expansion valve and the refrigerant between the medium pressure receiver and the second expansion valve, a pressure detection sensor for detecting a condensing pressure, and a controller for starting an injection control by the third expansion valve at the time when the condensing pressure detected by the pressure sensor or the condensing temperature calculated from the condensing pressure becomes a first predetermined value or more and stopping the injection control at the time when the condensing pressure or the condensing temperature becomes a second predetermined value which is smaller than the first predetermined value, or less. With this arrangement, an appropriate injection control can be realized and a high hot water supply/heating capability operation can be carried out.

15 Claims, 5 Drawing Sheets

HEAT PUMP TYPE HOT WATER SUPPLY OUTDOOR APPARATUS

BACKGROUND OF THE INVENTION

1. Field of the Invention

The present invention relates to a heat pump type hot water supply outdoor apparatus having a water heat exchanger and an injection circuit.

2. Description of the Related Art

It is disclosed that since conventional air conditioners have an injection circuit and a circulation amount of refrigerant can be increased on an indoor heat exchanger side during a heating operation, they can secure a heating capability even at the time when an air conditioning load is large such as when an outside air temperature is low and the like. However, nothing is disclosed as to an advantage and a control method in a case when it is applied to a heat pump hot water supply outdoor apparatus having a water heat exchanger (refer to, for example, Japanese Unexamined Patent Application Publication No. 2006-258343 (FIG. 1 of page 1)).

The conventional air conditioner having the injection circuit determines whether or not an injection control is carried out based on an outside air temperature during a heating operation.

The injection control is carried out to exhibit an advantage of obtaining a high heating capability at the time when the ratio (compression ratio) between the pressure (high pressure) of the refrigerant discharged from a compressor and the pressure (low pressure) of the refrigerant sucked into the compressor.

Accordingly, when an outside air temperature is reduced at the time when the air conditioner carries out the heating operation, the compression ratio is increased because an evaporation temperature is reduced and a suction pressure is also reduced.

Thus, the injection control is carried out when the outside air temperature is reduced. This is because since a condensing temperature corresponding to high pressure changes only in the range of from about 35° C. to 50° C. in a case where it is used for the air conditioner, a state in which the compression ratio is high can be assumed by an outside air temperature by which a low pressure is determined.

However, in a heat pump type hot water supply outdoor apparatus, a condensing temperature corresponding to the high pressure changes within the wide range of from 20° C. to 65° C. or more. As a result, when whether or not the injection control is carried out is determined only by the outside air temperature, a problem arises in that a capability becomes insufficient because the injection control is not carried out regardless of a condition that the compression ratio is high or the capability is excessively increased because the injection control is carried out in a condition that the compression ratio is low.

Further, when the injection control is carried out in the condition that the compression ratio is low, since the discharge temperature of a compressor is reduced, the reliability of the compressor may be deteriorated.

Accordingly, the heat pump type hot water supply outdoor apparatus has a problem in that an optimum injection control cannot be realized only by the outside air temperature.

An object of the present invention, which was made to solve the above problems, is to obtain a heat pump type hot water supply outdoor apparatus which can realize an appropriate injection control, can permit a long period of time of use of equipment because the reliability thereof can be secured even if an outside air temperature and the temperature of supplied hot water change, can carry out a high hot water supply/heating capability operation or a highly effective hot water supply/heating operation, and can reduce energy consumption.

SUMMARY OF THE INVENTION

A heat pump type hot water supply outdoor apparatus according to the present invention, in which a compressor, a water heat exchanger for carrying out heat exchange between water and refrigerant, a first pressure reduction unit, a medium pressure receiver, a second pressure reduction unit, and an air heat exchanger for carrying out heat exchange between air and refrigerant are connected circularly, heat is supplied from outside air by the air heat exchanger, and heat is supplied to water by the water heat exchanger, has an injection circuit, a pressure detection sensor and a controller. The injection circuit is a bypass for a part of the refrigerant between the medium pressure receiver and the second pressure reduction unit to inject the part of refrigerant into a compression chamber of the compressor, and has a third pressure reduction unit and an internal heat exchanger for carrying out heat exchange between the refrigerant whose pressure is reduced by the third pressure reduction unit and the refrigerant between the medium pressure receiver and the second pressure reduction unit. The pressure detection sensor is disposed in the vicinity of a discharge port of the compressor and detects the condensing pressure of the refrigerant. The controller carries out a control for starting an injection control at the time when a condensing pressure detected by the pressure detection sensor or a condensing temperature calculated from the condensing pressure becomes a first predetermined value or more, and stopping the injection control at the time when the condensing pressure detected by the pressure detection sensor or the condensing temperature calculate from the condensing pressure becomes a second predetermined value, which is smaller than the first predetermined value, or less.

According to the present invention, the injection control is carried out appropriately by proper determination based on the condensing pressure or the condensing temperature calculated from the condensing pressure, so that the heat pump type hot water supply outdoor apparatus is advantageous in that an appropriate injection control can be carried out, equipment can be used for a long period of time because the reliability thereof can be secured even at the time when an outside air temperature and the temperature of supplied hot water change, a high hot water supply/heating capability operation or a highly effective hot water supply/heating operation can be carried out, and energy consumption can be reduced.

DESCRIPTION OF THE PREFERRED EMBODIMENTS

Embodiment 1

Figure 1:
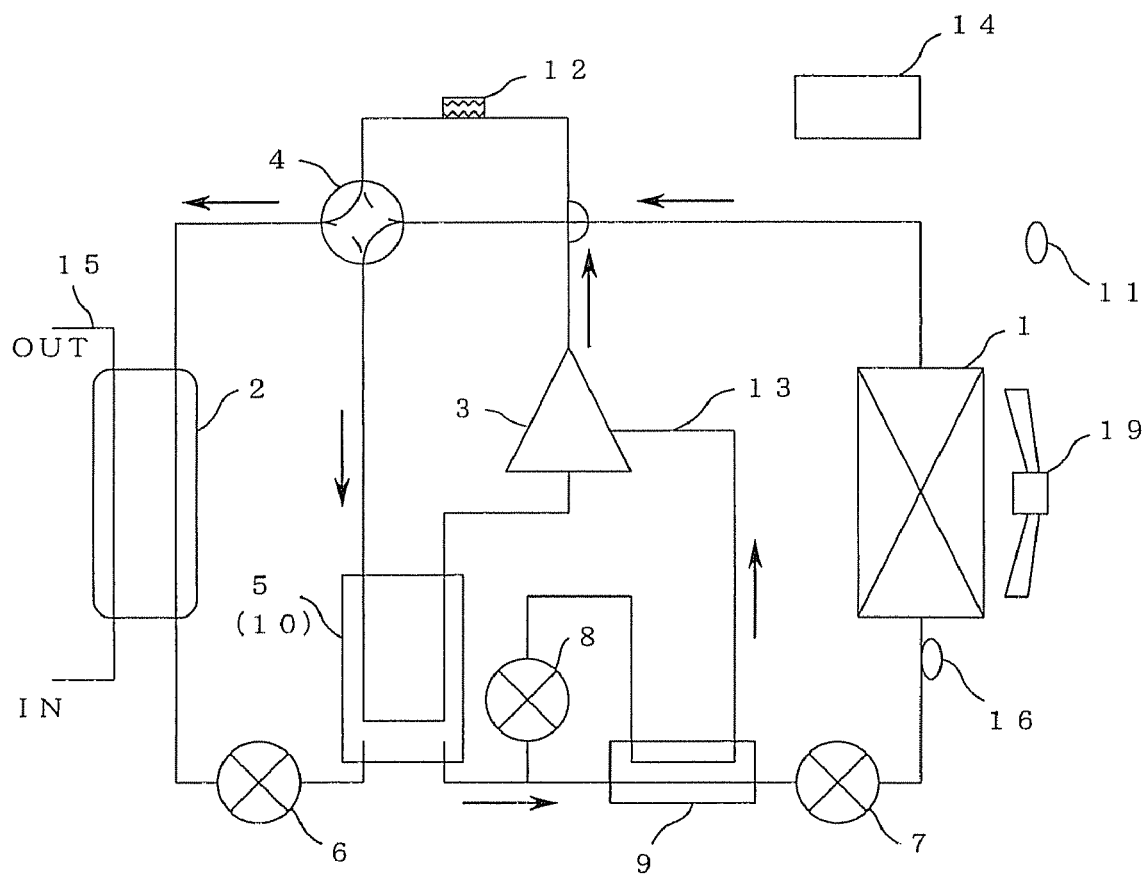
FIG. 1 is a refrigerant circuit diagram of a heat pump type hot water supply outdoor apparatus of an embodiment 1 of the present invention.
Figure 2:
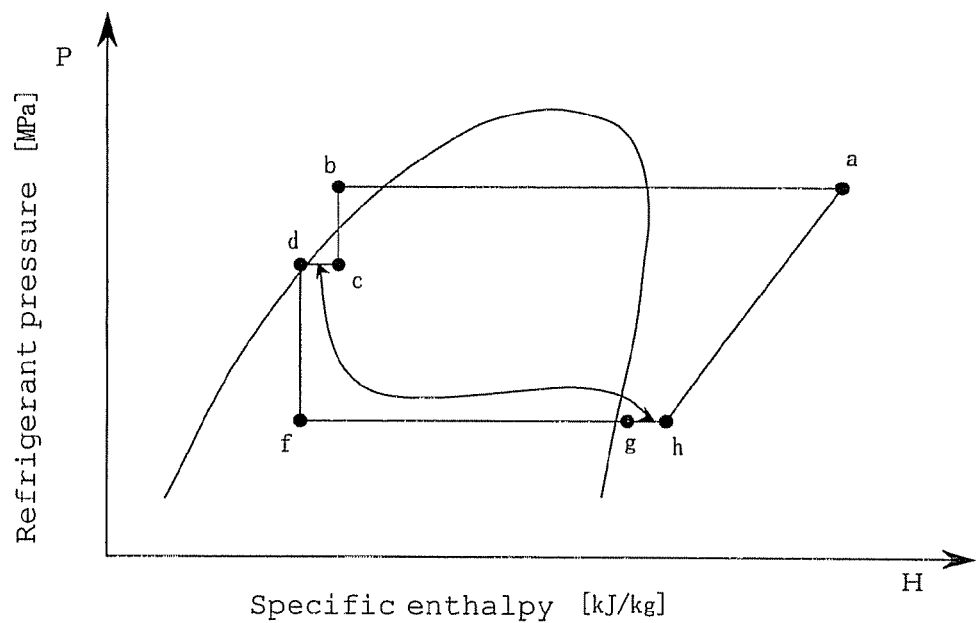
FIG. 2 is a PH graph showing an operating state of the hot water supply/heating operation in which the heat pump type hot water supply outdoor apparatus does not carry out injection.
Figure 3:
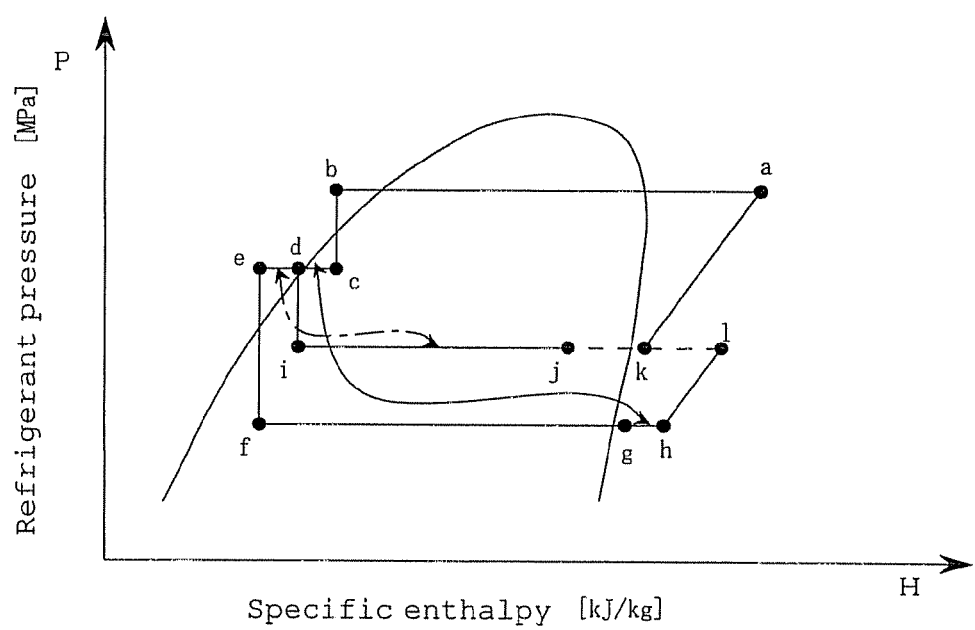
FIG. 3 is a PH graph showing an operating state of the hot water supply/heating operation in which the heat pump type hot water supply outdoor apparatus carries out the injection.
Figure 4:
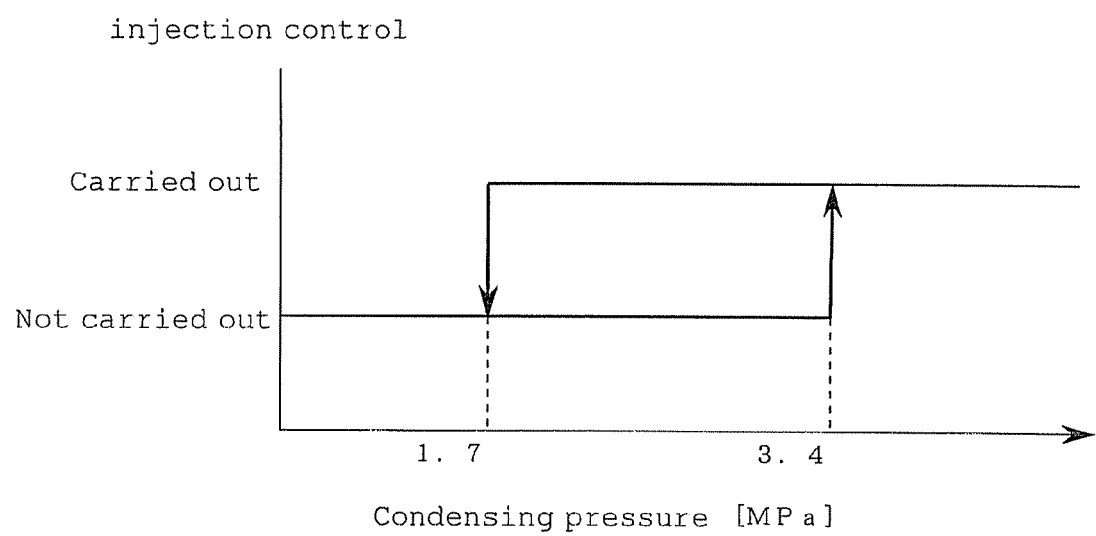
FIG. 4 is a transition view showing whether or not an injection control is carried out according to a condensing pressure of the heat pump type hot water supply outdoor apparatus.
Figure 5:
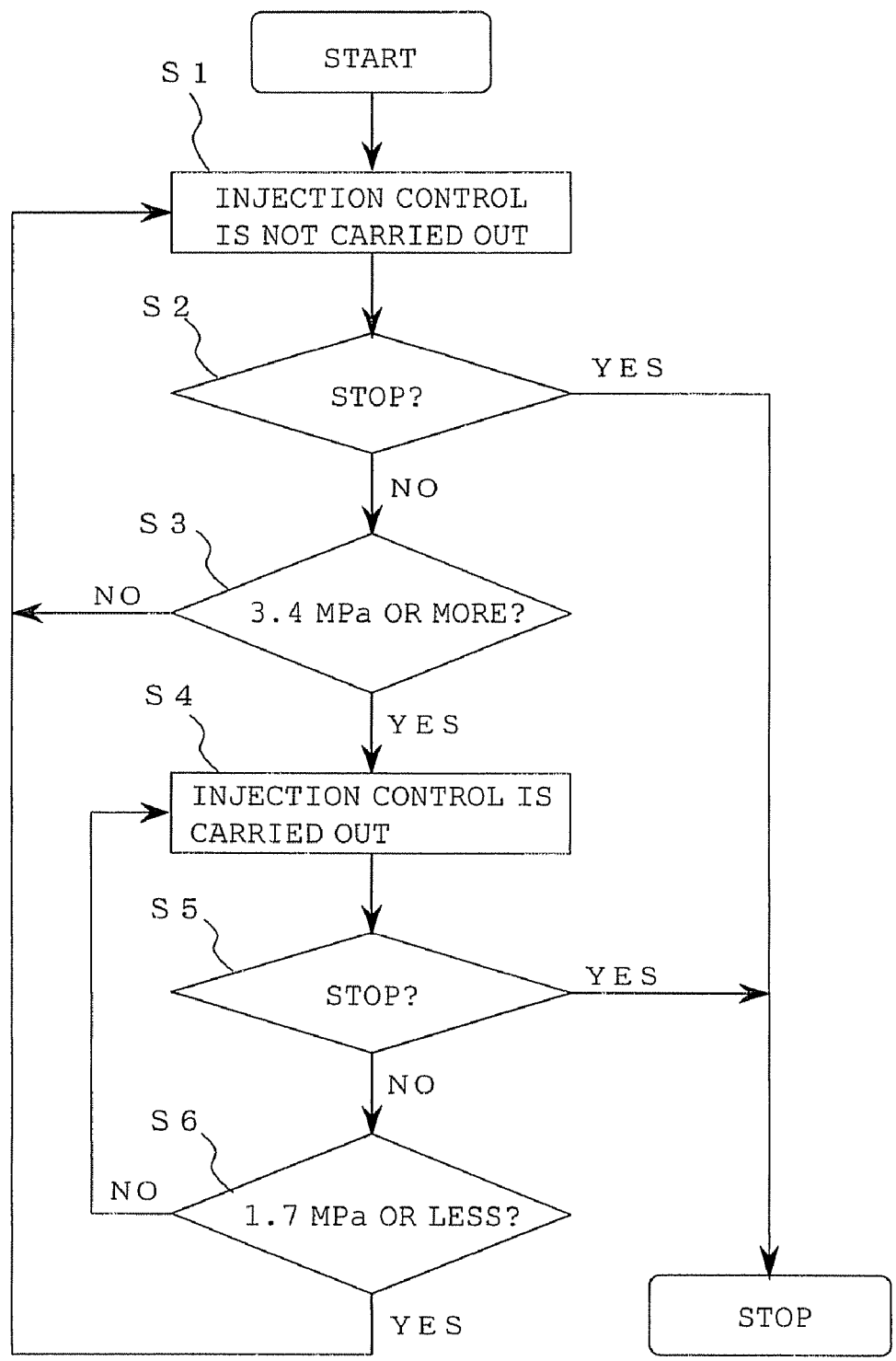
FIG. 5 is a flowchart showing an injection control operation of the heat pump type hot water supply outdoor apparatus.

FIG. 1 is a refrigerant circuit diagram of a heat pump type hot water supply outdoor apparatus of an embodiment 1 of the present invention, FIG. 2 is a PH graph showing an operating state of the hot water supply/heating operation in which the heat pump type hot water supply outdoor apparatus does not carry out injection, FIG. 3 is a PH graph showing an operating state of the hot water supply/heating operation in which the heat pump type hot water supply outdoor apparatus carries out the injection, FIG. 4 is a transition view showing whether or not an injection control is carried out according to a condensing pressure of the heat pump type hot water supply outdoor apparatus, and FIG. 5 is a flowchart showing an injection control operation of the heat pump type hot water supply outdoor apparatus.

In FIG. 1, a compressor 3, a 4-way valve 4 for switching a hot water supply/heating operation and a defrost operation, a water heat exchanger 2 for carrying out heat exchange between water and refrigerant, a first expansion valve 6 for adjusting a flow amount of refrigerant and reducing its pressure, a medium pressure receiver 5, a first internal heat exchanger 9, a second expansion valve 7 for adjusting a flow amount of the refrigerant and reducing its pressure, and an air heat exchanger 1 for carrying out heat exchange between air and the refrigerant are connected circularly through piping.

An injection circuit 13 has one end connected between the medium pressure receiver 5 and the first internal heat exchanger 9 and the other end connected to an injection port of the compressor 3. The injection circuit 13 is composed of a third expansion valve 8 for adjusting a flow amount of the refrigerant and reducing its pressure, and the first internal heat exchanger 9, connected through a pipe.

Further, a water pipe 15 is connected to the water heat exchanger 2, and water flows in the water pipe 15 and the water heat exchanger 2.

One end of the medium pressure receiver 5 is connected to the first expansion valve 6 for adjusting the flow amount of refrigerant and reducing its pressure and the other end thereof is connected to the first internal heat exchanger 9, a suction pipe of the compressor 3 passes through inside of the medium pressure receiver 5, and the refrigerant in a passing-through portion of the suction pipe can be subjected to heat exchange with the refrigerant in the medium pressure receiver 5.

The medium pressure receiver 5 has a function for holding the excessive refrigerant in the circuit and a function as the second internal heat exchanger 10 at the same time.

The circuit can be arranged even if the suction pipe is not caused to pass through inside of the medium pressure receiver 5. In this case, the medium pressure receiver 5 does riot have the function as the second internal heat exchanger.

The compressor 3 is of such a type that the capacity thereof is controlled by controlling the number of revolutions thereof by an inverter and has such a structure that the refrigerant can be supplied from the injection circuit 13 into a compression chamber in the compressor 3.

The first expansion valve 6, the second expansion valve 7, and the third expansion valve 8 are electronic expansion valves whose degrees of opening are variably controlled. Air is supplied to the air heat exchanger 1 by a fan 19 and the like and heat exchange with outside air is carried out. R410A or R407C, which is HFC mixed refrigerant, is used as the refrigerant of the heat pump type hot water supply outdoor apparatus.

A controller 14 is installed in the heat pump type hot water supply outdoor apparatus of the embodiment 1. A refrigerant circuit has a liquid refrigerant temperature sensor 16 interposed between the second expansion valve 7 and the air heat exchanger 1, to measure a refrigerant temperature at the installation position of the sensor.

Further, an outside air temperature sensor 11 measures an outside air temperature around the outdoor apparatus. The temperatures measured by the respective temperature sensors are supplied to the controller 14.

A pressure sensor 12 is disposed to a pipe for connecting the discharge side of the compressor 3 to the 4 way valve 4 for switching the hot water supply/heating operation and defrost operation and detects the pressure of discharged refrigerant.

A pipe from the pressure sensor 12 to the water heat exchanger 2 or the air heat exchanger 1 has a short length. Since the pipe has a small pressure loss, the pressure detected by the pressure sensor 12 is equal to the condensing pressure of the refrigerant in the water heat exchanger 2 or in the air heat exchanger 1. The condensing temperature of the refrigerant can be calculated from the condensing pressure.

The controller 14 controls an operation method of the compressor 3, switching of a flow path of the 4-way valve 4, the amount of air supplied by the fan of the air heat exchanger 1, the degrees of opening of the first expansion valve 6, the second expansion valve 7, and the third expansion valve 8, and the like based on the measurement information of the outside air temperature sensor 11, the liquid refrigerant temperature sensor 16, and the pressure sensor 12 and on the operation contents instructed by a user of the heat pump type hot water supply outdoor apparatus.

Next, an operation of the heat pump type hot water supply outdoor apparatus of the embodiment 1 will be explained.

First, a hot water supply/heating operation, in which an injection control is not carried out, will be explained based on the refrigerant circuit diagram shown in FIG. 1 and the PH graph in the hot water supply/heating operation shown in FIG. 2.

In the hot water supply/heating operation, the flow path of the 4-way valve 4 is set in solid line directions shown in FIG. 1.

The high temperature and high pressure gas refrigerant (point a of FIG. 2) discharged from the compressor 3 flows into the water heat exchanger 2 through the 4-way valve 4. Then, the gas refrigerant is condensed and liquefied while radiating heat in the water heat exchanger 2 acting as a condenser and is made to high pressure and low temperature liquid refrigerant (point b of FIG. 2). The heat radiated from the refrigerant is applied to the water on a load side that flows in the water pipe 15 to thereby heat the water.

After the high pressure and low temperature refrigerant from the water heat exchanger 2 is reduced in pressure by the first expansion valve 6 (point c of FIG. 2), it is made to gas-liquid two-phase refrigerant and flows into the medium pressure receiver 5. The high pressure and low temperature refrigerant is cooled by radiating heat to the low temperature refrigerant sucked by the compressor 3, in the medium pressure receiver 5 that functions as the second internal heat exchanger 10 (point d of FIG. 2) and flows out as liquid refrigerant.

All the refrigerant from the medium pressure receiver 5 flows into the first internal heat exchanger 9 without branching off into the injection circuit 13 because the third expansion valve 8 in the injection circuit 13 is closed.

Since the refrigerant does not flow to the injection circuit 13, it flows to the second expansion valve 7 without being subjected to heat exchange in the first internal heat exchanger 9.

The refrigerant is reduced in pressure and made to two-phase refrigerant (point f of FIG. 2) by the second expansion valve 7 and then flows into the air heat exchanger 1 acting as an evaporator in which it is evaporated and gasified by absorbing heat(point g of FIG. 2).

Thereafter, the gasified refrigerant passes through the 4-way valve 4, is subjected to heat exchange with high pressure refrigerant in the medium pressure receiver 5 by the function thereof as the second internal heat exchanger 10, is further heated (point h of FIG. 2), and is sucked by the compressor 3. The refrigerant sucked by the compressor 3 is compressed thereby, made to high temperature and high pressure gas refrigerant (point a of FIG. 2), and discharged from the compressor 3, and the same cycle is repeated.

In the hot water supply/heating operation in which the injection control is not carried out, since the operation can be carried out even in a state that the ratio between a high pressure and a low pressure (compression ratio) is low, a highly effective operation can be carried out when a load on the compressor 3 is lowered.

Further, since the temperature of the refrigerant discharged from the compressor 3 can be held at a high temperature, the reliability of the compressor 3 can be maintained.

However, when an operation is carried out at a high compression ratio, there is a feature in that since the temperature of the refrigerant discharged from the compressor 3 shown by the point a of FIG. 2, is excessively increased, the number of revolutions of the compressor 3 cannot be further increased in operation and thus a high hot water supply/heating capability cannot be obtained.

Next, a hot water supply/heating operation, in which the injection control is carried out, will be explained based on the refrigerant circuit diagram shown in FIG. 1 and the PH graph in the hot water supply/heating operation shown in FIG. 3.

In the hot water supply/heating operation, the flow path of the 4-way valve 4 is set in the solid line directions shown in FIG. 1.

The high temperature and high pressure gas refrigerant (point a of FIG. 3) discharged from the compressor 3 flows into the water heat exchanger 2 through the 4-way valve 4. Then, the gas refrigerant is condensed and liquefied while radiating heat in the water heat exchanger 2 acting as the condenser and is made to high pressure and low temperature liquid refrigerant (point b of FIG. 3). The heat radiated from the refrigerant is applied to the water on the load side that flow in the water pipe 15 to thereby heat the water.

After the high pressure and low temperature refrigerant from the water heat exchanger 2 is reduced in pressure by the first expansion valve 6 (point c of FIG. 3), it is made to gas-liquid two-phase refrigerant and flows into the medium pressure receiver 5. The high pressure and low temperature refrigerant is cooled by radiating heat to the low temperature refrigerant sucked by the compressor 3 in the medium pressure receiver 5 that functions as the second internal heat exchanger 10 (point d of FIG. 3) and flows out as liquid refrigerant.

Since the third expansion valve 8 in the injection circuit 13 is opened, the refrigerant from the medium pressure receiver 5 partially branches off into the injection circuit 13, the rest of the refrigerant flows into the first internal heat exchanger 9, is subjected to heat exchange with the refrigerant in the injection circuit 13 having the pressure and the temperature reduced by the third expansion valve 8, and is further cooled (point e of FIG. 3).

Thereafter, the refrigerant is reduced in pressure to a low level and made to two-phase refrigerant (point f of FIG. 2) by the second expansion valve 7 and thereafter flows into the air heat exchanger 1 acting as the evaporator in which it is evaporated and gasified by absorbing the heat (point g of FIG. 3).

Thereafter, the gasified refrigerant passing through the 4-way valve 4 is subjected to heat exchange with high pressure refrigerant in the medium pressure receiver 5 by the function thereof as the second internal heat exchanger 10, is further heated (point h of FIG. 3), and sucked by the compressor 3.

In contrast, the refrigerant branching off into the injection circuit 13 is reduced in pressure to a medium level by the third expansion valve 8, made to low temperature two-phase refrigerant (point i of FIG. 3), thereafter subjected to heat exchange with high pressure refrigerant by the first internal heat exchanger 9 (point j of FIG. 3), and injected into the compressor 3.

In the compressor 3, after the sucked refrigerant (point h of FIG. 3) is compressed to a medium pressure and heated (point 1 of FIG. 3), it joins the injected refrigerant, is compressed to a high pressure after the temperature thereof is reduced (point k of FIG. 3), made to high pressure gas refrigerant (point a of FIG. 3), and injected from the compressor 3, and the same cycle is repeated.

In the hot water supply/heating operation described above in which the injection control is carried out, since the temperature of the refrigerant injected from the compressor 3 can be reduced even in an operation in which the ratio between the high pressure and the low pressure (compression ratio) is high, the number of revolutions of the compressor 3 can be increased in operation, and the high hot water supply/heating capability can be obtained.

However, the operation is carried out at a low compression ratio, the temperature of the refrigerant discharged from the compressor 3 is reduced, by which the life of the compressor 3 may be shortened.

As described above, the operations having the two types of features in a case that the injection control is carried out and is not carried out can be carried out. Accordingly, equipment can be used for a long period of time because reliability can be secured by appropriately determining whether or not the injection control is carried out. Further, a high hot water supply/heating capability operation can be carried out or a highly effective hot water supply/heating operation can be carried out, and energy consumption can be reduced.

A conventional air conditioner determines whether or not the injection control is carried out according to an outside air temperature detected by an outside air temperature sensor.

When, for example, an outside air temperature is reduced to 3° C. or less, the injection control is carried out by opening the third expansion valve so that a high heating capability is exhibited. This is because that since a condensing temperature corresponding to a high pressure at the time when the air conditioner is used for a heating operation, only changes in the range of from about 35° C. to 50° C., a state in which a compression ratio is high can be assumed at an outside air temperature by which a low pressure is determined.

In contrast, when the same control is carried out in the heat pump type hot water supply outdoor apparatus which uses R410A as refrigerant whose condensing temperature changes in the wide range of 20° C. to 65° C. or more, for example, when an operation is carried out at an outside air temperature of 10° C. and a condensing temperature of 60° C., the apparatus is operated at a high compression ratio of 3.8 because condensing pressure (high pressure) becomes about 3.8 MPa and an evaporation pressure (low pressure) becomes about 1.0 MPa (evaporation temperature is about 7° C.). Accordingly, when the operation in which the injection control is not carried out is carried out, a discharge temperature is increased, and the number of revolutions of the compressor 3 can not be increased in operation. Thus, the high hot water supply/heating capability cannot be obtained.

To cope with the above problem, the heat pump type hot water supply outdoor apparatus of the embodiment 1 of the present invention can carry out the injection control when "the condensing pressure detected by the pressure sensor 12" becomes a predetermined value, for example, 3.4 MPa (corresponding to about 55° C. in terms of a condensing temperature) or more. Therefore, the high hot water supply/heating capability can be obtained even in a state of the outside air temperature of 10° C. that is higher than 3° C.

Further, the same advantage can be obtained even if the injection control is carried out at the time when "the condensing temperature calculated from the condensing pressure detected by the pressure sensor 12" becomes a predetermined value, for example, 55° C. or more.

In the above explanation, only the condensing pressure detected by the pressure sensor 12 is taken into consideration, and the injection control is carried out when the condensing pressure becomes 3.4 MPa or more. However, intrinsically, an evaporation pressure must be also taken into consideration in addition to the condensing pressure from the view point of determining whether or not the injection control is carried out based on the compression ratio.

Thus, the same advantage can be obtained even if the injection control is carried out at the time when the ratio between "the condensing pressure detected by the pressure sensor 12" and "the evaporation pressure calculated from the evaporation temperature detected by the liquid refrigerant temperature sensor 16" becomes a predetermined value or more.

When the above example is examined, the same advantage can be obtained even if the injection control is carried out at the ratio of, for example, 3.2 or more including an allowance.

Further, since the condensing temperature can be determined from condensing temperature by calculation, whether or not the injection control is carried out can be also determined from the ratio between the condensing temperature and the evaporation temperature by detecting the evaporation temperature.

Thus, the same advantage can be obtained even if the injection control is carried out at the time when the ratio between "the condensing temperature calculated from the condensing pressure detected by the pressure sensor 12" and "the evaporation temperature detected by the liquid refrigerant temperature sensor 16" becomes a predetermined value or more.

However, when the ratio between temperatures is used, the temperatures may have a minus value, so that the determination needs to be carried out from the ratio of, for example, the condensing temperature +50° C. and the evaporation temperature +50° C. When this is examined in the above example, (60+50)/(7+50)=1.93. Accordingly, the same advantage can be obtained even if the injection control is carried out at the ratio of, for example, 1.8 or more.

Further, since whether or not the injection control is carried out can be determined from the ratio between the condensing pressure and the evaporation pressure as described above, it can be also determined from the difference between the condensing pressure and the evaporation pressure provided that a predetermined correlation exists between them as the condensing temperature changes.

Thus, the same advantage can be obtained even if the injection control is carried out at the time when the difference between "the condensing pressure detected by the pressure sensor 12" and "the evaporation pressure calculated from the evaporation temperature detected by the liquid refrigerant temperature sensor 16" becomes a predetermined value or more.

When this is examined in the above example, 3.8−1.0=2.8. Accordingly, the same advantage can be obtained even if the injection control is carried out at the time when the difference becomes, for example, 2.0 or more.

If whether or not the injection control is carried out can be determined from the difference between the condensing pressure and the evaporation pressure as described above, it can be also determined from the difference between the condensing temperature and the evaporation temperature.

Thus, the same advantage can be obtained even if the injection control is carried out at the time when the difference between "the condensing temperature calculated from the condensing pressure detected by the pressure sensor 12" and "the evaporation temperature detected by the liquid refrigerant temperature sensor 16" becomes a predetermined value or more.

When this is examined as to the above example, 60−7=53. Accordingly, the same advantage can be obtained even if the injection control is carried out at the time when the difference becomes, for example, 45 or more.

In the above explanation, the injection control is appropriately carried out when the compression ratio becomes a predetermined value or more. However, it will be explained here that there is a case in which it is appropriate not to carry out the injection control when the compression ratio becomes a predetermined value or less.

In an operation carried out at, for example, an outside air temperature of 0° C. and a condensing temperature of 20° C., since the condensing pressure (high pressure) becomes about 1.4 MPa, and the evaporation pressure (low pressure) becomes about 0.7 MPa (evaporation temperature becomes about −3° C.), an operation is carried out at a low compression ratio of 2.0. Thus, when the injection control is carried out in the operation, the hot water supply/heating capability becomes excessively large and the temperature of the refrigerant discharged from the compressor 3 is reduced by the injection control. The life of the compressor 3 may be shortened as a result.

In the heat pump type hot water supply outdoor apparatus of the embodiment 1 of the present invention, since it is possible not to carry out the injection control at the time when "the condensing pressure detected by the pressure sensor 12" becomes a predetermined value, for example, 1.7 MPa (corresponding to about 26° C. in terms of the condensing temperature) or less, it can be prevented that the hot water supply capability is made excessively large and that the life of the compressor 3 is shortened by the drop of the temperature of discharged refrigerant, even under a condition that an outside air temperature is 0° C. that is lower than 3° C.

Further, the same advantage can be obtained even if the injection control is not carried out a the time when "the condensing temperature calculated from the condensing pressure detected by the pressure sensor 12" becomes a predetermined temperature, for example, 26° C. or less.

Likewise, in the embodiment 1, the same advantage can be obtained "even if the injection control is not carried out at the time when the ratio between the condensing pressure detected by the pressure sensor 12" and "the evaporation pressure calculated from the evaporation temperature detected by the liquid refrigerant temperature sensor 16" becomes a predetermined value or less.

When this is examined as to the above example, the same advantage can be obtained even if the injection control is not carried out at the ratio of, for example, 2.2 or less.

Likewise, in the embodiment 1, the same advantage can be obtained even if the injection control is not carried out at the time when the ratio between "the condensing temperature calculated from the condensing pressure detected by the pressure sensor 12" and "the evaporation temperature detected by the liquid refrigerant temperature sensor 16" becomes a predetermined value or less.

However, when the ratio between temperatures is used, the temperatures may have a minus value, so that the determination needs to be carried out from the ratio of, for example, the condensing temperature +50° C. and the evaporation temperature +50° C. When this is examined as to the above example, $(20+50)/(-3+50)=1.49$. Accordingly, the same advantage can be obtained even if the injection control is not carried out at the time when the ratio is, for example, 1.55 or less.

Likewise, in the embodiment 1, the same advantage can be obtained, even if the injection control is not carried out at the time when the difference between "the condensing pressure detected by the pressure sensor 12" and "the evaporation pressure calculated from the evaporation temperature detected by the liquid refrigerant temperature sensor 16" becomes a predetermined value or less. When this is examined as to the above example, $1.4-0.7=0.7$. Accordingly, the same advantage can be obtained even if the injection control is riot carried out at the time when the difference becomes, for example, 1.0 or less.

Likewise, in the embodiment 1, the same advantage can be obtained even if the injection control is not carried out at the time when the difference between "the condensing temperature calculated from the condensing pressure detected by the pressure sensor 12" and "the evaporation temperature detected by the liquid refrigerant temperature sensor 16" becomes a predetermined value or less. When this is examined as to the above example, $20-(-3)=23$.

Accordingly, the same advantage can be obtained even if the injection control is not carried out at the time when the difference is, for example, 30 or less.

The injection control will be summarized from the above explanation as described below.

There is examined a case in which the injection control is carried out at the time when, for example, "the condensing pressure detected by the pressure sensor 12" becomes 3.4 MPa (corresponding to about 55° C. in terms of the condensing temperature) or more and the injection control is not carried out at the time when "the condensing pressure detected by the pressure sensor 12" becomes 1.7 MPa (corresponding to about 26° C. in terms of the condensing temperature) or less. Then, when the condensing pressure is 1.7 MPa or more and 3.4 MPa or less, a previous state is held. A transition state in this case is as shown in FIG. 5.

Note that when the heat pump type hot water supply outdoor apparatus is started up, the condensing pressure is not increased so that the injection control is not carried out.

Next, the injection control will be explained based on the flowchart of FIG. 5.

When the heat pump type hot water supply outdoor apparatus of the embodiment 1 is started up, it goes to a mode in which the injection control is not carried out (step S1).

Next, whether or not a stop command is issued is determined (step S2), and when the stop command is issued, the heat pump type hot water supply outdoor apparatus is stopped, whereas when the stop command is not issued, the mode goes to a pressure determination mode.

In the pressure determination mode, whether or not a pressure is 3.4 MPa or more is determined (step S3), and when the pressure is 3.4 MPa or more, the pressure determination mode goes to a mode for carrying out the injection control (step S4), whereas when the pressure is less than 3.4 MPa, the process returns to step S1 at which a mode for not carrying out the injection control is continued.

Next, whether or not the stop command is issued is determined while the injection control is being carried out (step S5), and when the stop command is issued, the heat pump type hot water supply outdoor apparatus is stopped, whereas when the stop command is not issued, the mode goes to another pressure determination mode.

In the pressure determination mode, whether or not the pressure is 1.7 MPa or less is determined (step S6), and when the pressure is equal to or less than 1.7 MPa, the process returns to step S1 which is the mode for not carrying out the injection control. Further, when the pressure exceeds 1.7 MPa, the mode for carrying out the injection control is continued.

The injection control can be optimumly carried out by repeating the above steps.

Whether or not the injection control is carried out is appropriately determined as described above. Since reliability can be secured even at the time when an outside air temperature and the temperature of supplied hot water change, the equipment can be used for a long period of time. Further, the high hot water supply/heating capability operation can be carried out or the highly effective hot water supply/heating operation can be carried out, and the energy consumption can be reduced.

Embodiment 2

Figure 6:
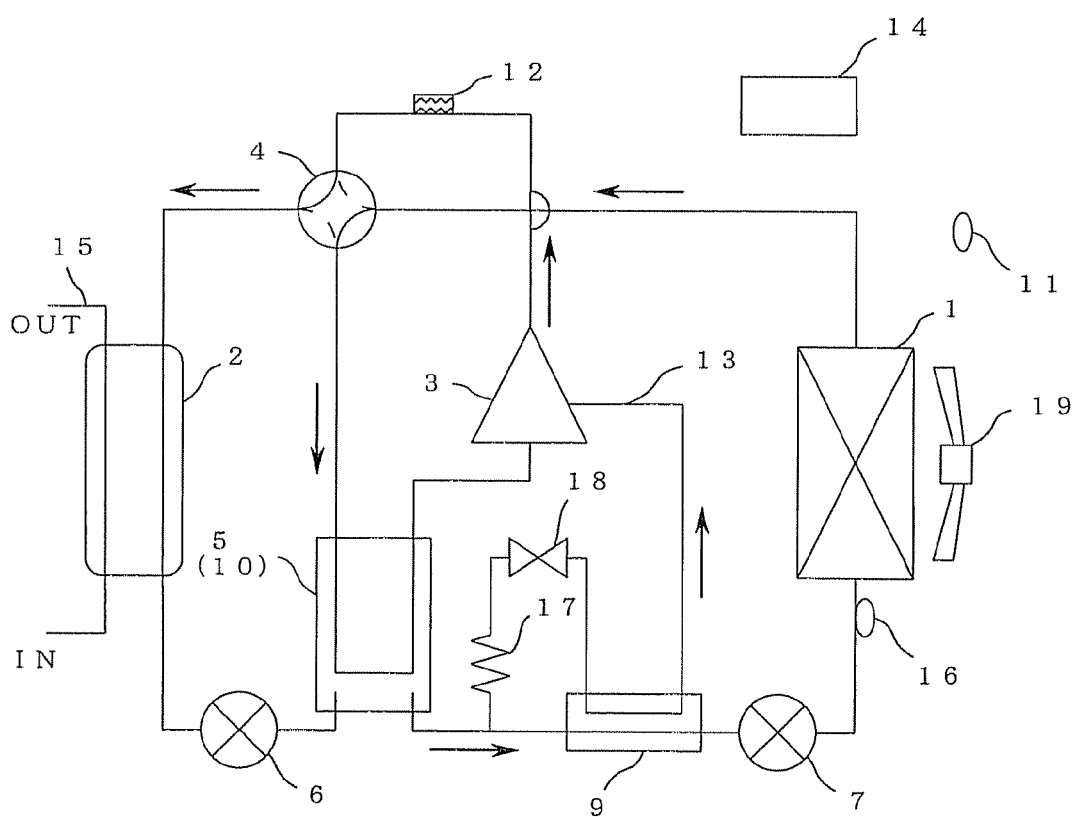
FIG. 6 is a refrigerant circuit diagram of a heat pump type hot water supply outdoor apparatus of an embodiment 2 of the present invention.

FIG. 6 is a refrigerant circuit diagram of a heat pump type hot water supply outdoor apparatus of an embodiment 2 of the present invention.

In the embodiment 2, the same constituents as those of the embodiment 1 are denoted by the same reference numerals, and explanation of the duplicate constituents is omitted.

In the embodiment 2, an injection circuit 13 is provided with a capillary tube 17 for adjusting the flow amount of refrigerant and reducing its pressure and an electromagnetic valve 18 for closing the flow of the refrigerant in place of the third expansion valve 8 in the injection circuit 13 of the embodiment 1.

Further, the embodiment 2 is arranged to have a pressure sensor 12 and a liquid refrigerant temperature sensor 16 for detecting a liquid refrigerant temperature in an evaporator likewise the embodiment 1.

In the second embodiment, whether or not injection is carried out is determined and an electromagnetic valve 18 is opened or closed, on the basis of "the condensing pressure detected by the pressure sensor 12" or "the condensing temperature calculated from the condensing pressure detected by the pressure sensor 12", the ratio between "the condensing pressure detected by the pressure sensor 12" and "the evaporation pressure calculated from the evaporation temperature detected by the liquid refrigerant temperature sensor 16", the ratio between "the condensing temperature calculated from the condensing pressure detected by the pressure sensor 12" and "the evaporation temperature detected by the liquid refrigerant temperature sensor 16", the difference between "the condensing pressure detected by the pressure sensor 12" and "the evaporation pressure calculated from the evaporation temperature detected by the liquid refrigerant temperature sensor 16", or the difference between "the condensing temperature calculated from the condensing pressure detected by the pressure sensor 12" and "the evaporation temperature detected by the liquid refrigerant temperature sensor 16", likewise the embodiment 1.

Accordingly, since a control can be carried out appropriately and reliability can be secured even at the time when an outside air temperature and the temperature of supplied hot water change, equipment can be used for a long period of time. Further, a high hot water supply/heating capability operation can be carried out or a highly effective hot water supply/heating operation can be carried out, so that energy consumption can be reduced.

Although an injection control range is limited in the capillary tube 17 and the electromagnetic valve 18 of the embodiment 2 as compared with the third expansion valve 8 of the embodiment 1, the heat pump type hot water supply outdoor apparatus can be realized less expensively.

Note that although the hot water supply/heating operation is explained in the embodiments 1 and 2, the air heat exchanger 1 is defrosted in a defrost operation by circulating the refrigerant discharged from the compressor 3 in the sequence of the air heat exchanger 1, the second expansion valve 7, the medium pressure receiver 5, the first expansion valve 6, and the water heat exchanger 2, through the 4-way valve 4 by operating it.

What is claimed is:

1. A heat pump type hot water supply outdoor apparatus, in which a compressor, a water heat exchanger for carrying out heat exchange between water and refrigerant, a first pressure reduction unit, a medium pressure receiver, a second pressure reduction unit, and an air heat exchanger for carrying out heat exchange between air and refrigerant are connected circularly, heat is supplied from outside air by the air heat exchanger, and heat is supplied to water by the water heat exchanger comprising:
    an injection circuit which is a bypass for a part of the refrigerant between the medium pressure receiver and the second pressure reduction unit, to inject the part of refrigerant into a compression chamber of the compressor, and has a third pressure reduction unit and an internal heat exchanger for carrying out heat exchange between the refrigerant whose pressure is reduced by the third pressure reduction unit and the refrigerant between the medium pressure receiver and the second pressure reduction unit;
    a pressure detection sensor disposed in the vicinity of a discharge port of the compressor for detecting a condensing pressure of the refrigerant; and
    a controller for carrying out a control for starting an injection control at the time when a condensing pressure detected by the pressure detection sensor or a condensing temperature calculated from the condensing pressure becomes a first predetermined value or more, and stopping the injection control at the time when the condensing pressure detected by the pressure detection sensor or the condensing temperature calculate from the condensing pressure becomes a second predetermined value, which is smaller than the first predetermined value, or less.

2. The heat pump type hot water supply outdoor apparatus according to claim 1, wherein the third pressure reduction unit of the injection circuit is an expansion valve.

3. The heat pump type hot water supply outdoor apparatus according to claim 1, wherein the third pressure reduction unit of the injection circuit comprises a capillary and an electromagnetic valve.

4. The heat pump type hot water supply outdoor apparatus according to claim 1, wherein refrigerant used in a refrigeration cycle is R410A or R407C.

5. The heat pump type hot water supply outdoor apparatus according to claim 1, comprising a 4-way valve disposed on an discharge side of the compressor for switching a hot water supply/heating operation in which refrigerant is circulated in the sequence of the water heat exchanger, the first pressure reduction unit, the medium pressure receiver, the second pressure reduction unit, and the air heat exchanger, and a defrost operation in which refrigerant is circulated in the sequence of the air heat exchanger, the second pressure reduction unit, the medium pressure receiver, the first pressure reduction unit, and the water heat exchanger.

6. A heat pump type hot water supply outdoor apparatus, in which a compressor, a water heat exchanger for carrying out heat exchange between water and refrigerant, a first pressure reduction unit, a medium pressure receiver, a second pressure reduction unit, and an air heat exchanger for carrying out heat exchange between water and refrigerant are connected circularly, heat is supplied from outside air by the air heat exchanger, and heat is supplied to water by the water heat exchanger comprising:
    an injection circuit which is a bypass for a part of the refrigerant between the medium pressure receiver and the second pressure reduction unit, to inject the part of refrigerant into a compression chamber of the compressor, and has a third pressure reduction unit and an internal heat exchanger for carrying out heat exchange between the refrigerant whose pressure is reduced by the third pressure reduction unit and the refrigerant between the medium pressure receiver and the second pressure reduction unit;
    a pressure detection sensor disposed in the vicinity of a discharge port of the compressor, for detecting a condensing pressure of the refrigerant;
    a liquid refrigerant temperature sensor attached to a refrigerant inlet of the air heat exchanger, for detecting an evaporation temperature of liquid refrigerant; and
    a controller for carrying out a control for starting an injection control by the third pressure reduction unit at the time when the ratio between the condensing pressure detected by the pressure sensor and the evaporation pressure calculated from evaporation temperature detected by the liquid refrigerant temperature sensor, or the ratio between the condensing temperature calculated from the condensing pressure and the evaporation temperature becomes a first a predetermined ratio or more, and stopping the injection control at the time when the ratio between the condensing pressure and the evaporation pressure or the ratio between the condensing temperature and the evaporation temperature becomes a second predetermined ratio which is smaller than the first predetermined ratio, or less.

7. The heat pump type hot water supply outdoor apparatus according to claim 6, wherein the third pressure reduction unit of the injection circuit is an expansion valve.

8. The heat pump type hot water supply outdoor apparatus according to claim 6, wherein the third pressure reduction unit of the injection circuit comprises a capillary and an electromagnetic valve.

9. The heat pump type hot water supply outdoor apparatus according to claim 6, wherein refrigerant used in a refrigeration cycle is R410A or R407C.

10. The heat pump type hot water supply outdoor apparatus according to claim 6, comprising a 4-way valve disposed on an discharge side of the compressor for switching a hot water supply/heating operation in which refrigerant is circulated in the sequence of the water heat exchanger, the first pressure reduction unit, the medium pressure receiver, the second pressure reduction unit, and the air heat exchanger, and a defrost operation in which refrigerant is circulated in the sequence of the air heat exchanger, the second pressure reduction unit, the medium pressure receiver, the first pressure reduction unit, and the water heat exchanger.

11. A heat pump type hot water supply outdoor apparatus, in which a compressor, a water heat exchanger for carrying out heat exchange between water and refrigerant, a first pressure reduction unit, a medium pressure receiver, a second pressure reduction unit, and an air heat exchanger for carrying out heat exchange between water and refrigerant are connected circularly, heat is supplied from outside air by the air heat exchanger, and heat is supplied to water by the water heat exchanger, comprising:

an injection circuit which is a bypass for a part of the refrigerant between the medium pressure receiver and the second pressure reduction unit, to inject the part of refrigerant into a compression chamber of the compressor, and has a third pressure reduction unit and an internal heat exchanger for carrying out heat exchange between the refrigerant whose pressure is reduced by the third pressure reduction unit and the refrigerant between the medium pressure receiver and the second pressure reduction unit;

a pressure detection sensor disposed in the vicinity of a discharge port of the compressor for detecting the condensing pressure of the refrigerant;

a liquid refrigerant temperature sensor attached to a refrigerant inlet of the air heat exchanger for detecting an evaporation temperature of liquid refrigerant; and a controller for carrying out a control for starting an injection control by the third pressure reduction unit at the time when a difference between the condensing pressure detected by the pressure sensor and the evaporation pressure calculated from evaporation temperature detected by the liquid refrigerant temperature sensor, or a difference between the condensing temperature calculated from the condensing pressure and the evaporation temperature becomes a first a predetermined difference or more, and stopping the injection control at the time when the difference between the condensing pressure and the evaporation pressure or the difference between the condensing temperature and the evaporation temperature becomes a second predetermined difference which is smaller than the first predetermined difference, or less.

12. The heat pump type hot water supply outdoor apparatus according to claim 11, wherein the third pressure reduction unit of the injection circuit is an expansion valve.

13. The heat pump type hot water supply outdoor apparatus according to claim 11, wherein the third pressure reduction unit of the injection circuit comprises a capillary and an electromagnetic valve.

14. The heat pump type hot water supply outdoor apparatus according to claim 11, wherein refrigerant used in a refrigeration cycle is R410A or R407C.

15. The heat pump type hot water supply outdoor apparatus according to claim 11, comprising a 4-way valve disposed on an discharge side of the compressor for switching a hot water supply/heating operation in which refrigerant is circulated in the sequence of the water heat exchanger, the first pressure reduction unit, the medium pressure receiver, the second pressure reduction unit, and the air heat exchanger, and a defrost operation in which refrigerant is circulated in the sequence of the air heat exchanger, the second pressure reduction unit, the medium pressure receiver, the first pressure reduction unit, and the water heat exchanger.

* * * * *